US006762932B2

(12) United States Patent
Regimbal et al.

(10) Patent No.: US 6,762,932 B2
(45) Date of Patent: Jul. 13, 2004

(54) METHOD AND SYSTEM FOR MOUNTING AN INFORMATION HANDLING SYSTEM STORAGE DEVICE

(75) Inventors: Laurent A. Regimbal, Round Rock, TX (US); Christopher S. Beall, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/245,223

(22) Filed: Sep. 17, 2002

(65) Prior Publication Data

US 2004/0052046 A1 Mar. 18, 2004

(51) Int. Cl.[7] .................................................. G06F 1/16
(52) U.S. Cl. ....................... 361/683; 361/727; 361/752; 361/801; 710/28
(58) Field of Search .............................. 361/683–680, 361/724–727, 788, 758, 752, 801; 312/223.1, 223.2; 439/61–65; 710/28

(56) References Cited

U.S. PATENT DOCUMENTS

| | | | | |
|---|---|---|---|---|
| 5,566,383 A | * | 10/1996 | Gildea et al. | 361/685 |
| 5,678,064 A | * | 10/1997 | Kulik et al. | 710/28 |
| 5,973,918 A | * | 10/1999 | Felcman et al. | 361/683 |
| 6,040,980 A | | 3/2000 | Johnson | 361/685 |
| 6,055,152 A | * | 4/2000 | Felcman et al. | 361/683 |
| 6,313,984 B1 | * | 11/2001 | Furay | 361/685 |
| 6,325,636 B1 | * | 12/2001 | Hipp et al. | 439/61 |
| 6,392,875 B1 | | 5/2002 | Erickson et al. | 361/683 |
| 6,411,506 B1 | | 6/2002 | Hipp et al. | 361/686 |
| 6,560,098 B1 | * | 5/2003 | Beinor et al. | 361/685 |

* cited by examiner

*Primary Examiner*—Lisa Lea-Edmonds
(74) *Attorney, Agent, or Firm*—Hamilton & Terrile, LLP; Robert W. Holland

(57) ABSTRACT

A method and system for mounting an information handling system disk drive with one or more storage disk drives coupled to an information handling system circuit board so that components of the information handling system are disposed in the space between the storage disk drive and the circuit board. In one embodiment, a server blade mounts plural hard disk drives to a motherboard with tool-less shoulder screws that elevate the hard disk drives relative to the motherboard to allow space for interfacing components, such as a bridge chip and video chip, with the motherboard below the hard disk drive. Cooling air flows through the space between the motherboard and the hard disk drives to cool plural processors interfaced with the motherboard.

23 Claims, 5 Drawing Sheets

METHOD AND SYSTEM FOR MOUNTING AN INFORMATION HANDLING SYSTEM STORAGE DEVICE

BACKGROUND OF THE INVENTION

1. Field of the Invention

The present invention relates in general to the field of information handling systems, and more particularly to a method and system for mounting an information handling system storage device, such as a hard disk drive.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One frequent consideration in the design of information handling systems is the size or footprint taken up by an information handling system. For example, information handling systems that process network information generally attempt to package relatively large amounts of computing power in relatively small housings. In blade servers, as an example, a series of blades are installed in a rack with each blade typically having the information handling components to perform as an independent server. Each server blade in a blade rack typically includes a motherboard with wire lines routed to support communications between components, one or more processors to process network information and a disk storage device, such as a hard disk drive to store information. Motherboard space is a high value commodity on server blades so that blade server information handling system components are generally configured with each planar much smaller than conventional servers having the same functionality.

One problem with configuring server blades is the design of component locations on the motherboard that efficiently perform desired functions in as little board space as practical. As an example, the mounting location for hard disk drives presents a difficult problem since designers can ill afford to lose board space to accommodate the placement of hard drives versus other components and motherboard routing. In addition, hard drives tend to generate heat and have relatively low allowable operating temperatures. Thus, hard drives generally are located near a cooling air inlet to receive cooling from fresh air for greater cooling. However, placement of hard drives near a fresh air inlet tends to interfere with cooling of other components such as processors and other types of chip sets and individual chips, such as bridge chips. Typically, planars for server blades screw hard drives directly to the motherboard and then space other components to aid in achieving adequate airflow. Alternatively, hard drives are mounted remotely and interfaced with a cable to the planar. However, such spaced configurations have greater footprints for the available computing power and tend to have increased complexity and cost in the design and manufacture of blade servers.

SUMMARY OF THE INVENTION

Therefore a need has arisen for a method and system which mounts disk storage devices to a circuit board with a reduced footprint.

A further need exists for a method and system which mounts a hard disk drive to a server blade motherboard with reduced interference to cooling air flow.

A further need exists for a method and system which reduces complexity in the design and manufacture of blade servers.

In accordance with the present invention, a method and system are provided which substantially reduce the disadvantages and problems associated with previous methods and systems for mounting storage devices to an information handling system circuit board. The storage device is coupled to the circuit board so that a space exists between the storage device and the circuit board. Information handling system components are disposed on the circuit board in the space between the storage device and the circuit board to effectively reduce the footprint of the information handling system and to allow cooling air to flow past the storage device through the space with reduced interference.

More specifically, a hard disk drive mounts to a server blade motherboard with attachment devices that elevate the bottom surface of the hard disk drive distally from the top surface of the motherboard. One or more information handling system components, such as bridge or video chips, interface with the motherboard at a location in the space beneath the hard disk drive. The hard disk drive is assembled to the motherboard over the one or more components with an elevated attachment assembly. For instance, shoulder screws couple to the hard disk drive at one end and insert into openings of the motherboard at another end. A recessed area of the shoulder screw engages a narrow portion of a keyhole-shaped motherboard opening and guides the hard disk drive interface into a motherboard interface. A locking feature in the spring engages a locking feature in the opening of the motherboard to hold the hard disk drive in position and elevation springs reduce hard disk drive movement by pushing the lip of the recessed area against the surface of the motherboard.

The present invention provides a number of important technical advantages. One example of an important technical advantage is that disk storage devices mount to a circuit board with a reduced footprint by allowing information handling system components to mount to the circuit board in the space between the disk storage device and the circuit board. The improved use of board space allows more dense information handling systems, such as a two processor and two hard drive server blade in a form factor sufficiently small so as to allow eighteen such server blades in a 3U space.

Another example of an important technical advantage of the present invention is that a hard disk drive mounts to a server blade motherboard with reduced interference to cooling air flow for other components, such as processors. Elevation of the hard disk drives relative to the motherboard permits air flow across the bottom surface of the hard disk drive as well as the components that are mounted beneath the hard disk drive. Reduced interference to air flow allows a greater amount of cooling air to flow to components configured on the motherboard further from the air inlet than the hard disk drive, such as the processors. Further, airflow along the surface of the motherboard provides more efficient cooling of components mounted at the motherboard, such as processor heat sinks.

Another example of an important technical advantage of the present invention is that it reduces complexity in the design and manufacture of server blades. For instance, shoulder screws that slidingly engage motherboard openings allow tool-less assembly of hard disk drives to server blade motherboards. An elevated attachment assembly adapts a variety of disk storage devices to couple to a motherboard with minimal design changes. Further, quiet operation is maintained by elevation springs that hold the hard disk drive in position relative to the motherboard. The elevation springs absorb vibrations and reduce movement of the hard disk drive due to spacing gaps introduced by tolerance stack-up.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Circuit board space is a valuable asset when information handling systems are designed to include substantial processing power in a minimal footprint, such as with blade servers. To efficiently use board space, the present invention elevates a disk storage device relative to the board to define a space in which information handling system components are located. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
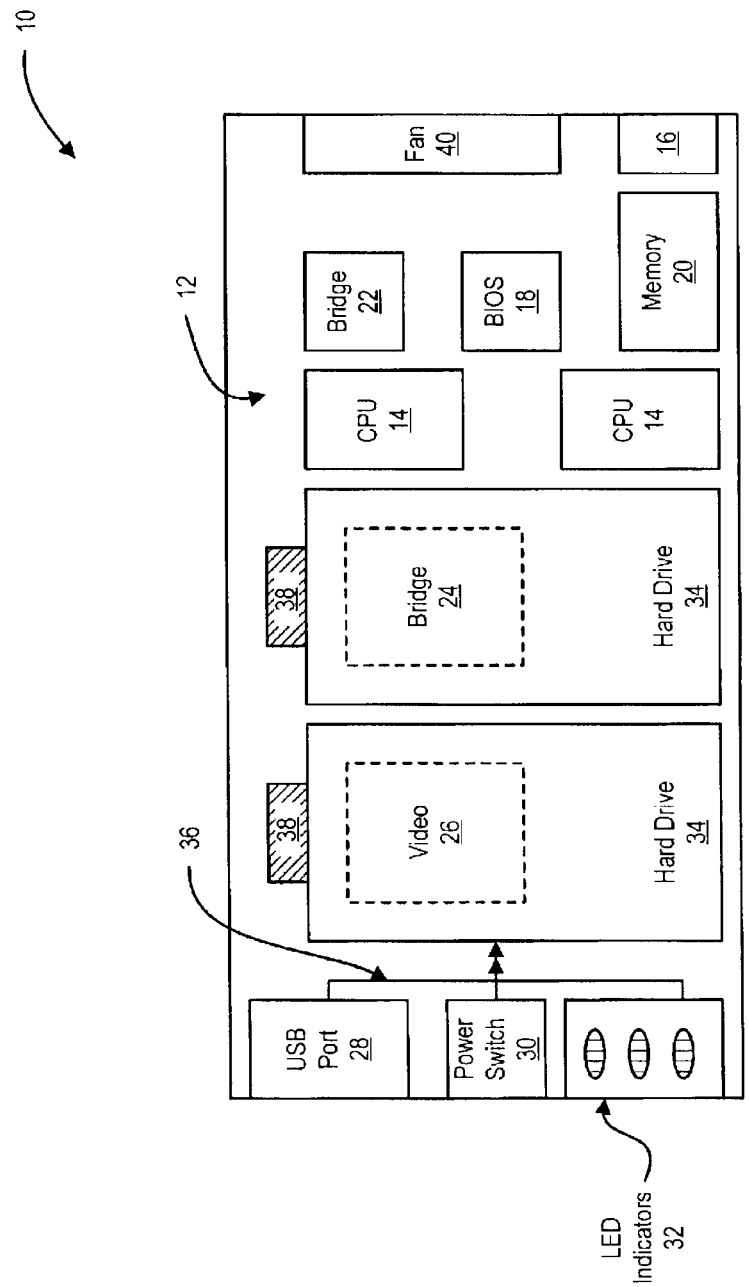
FIG. 1 depicts a top view block diagram of a server blade.

Referring now to FIG. 1, a block diagram depicts a top view of an information handling system configured as a multi-processor server blade 10. Server blade 10 is built on a motherboard 12, such as a printed circuit board that includes wire lines that route signals between information processing components. First and second CPUs 14 process network information communicated through a network port 16. A BIOS 18, memory 20, north bridge 22, south bridge 24 and video module 26 communicate with each other and CPUs 14 through motherboard 12 to perform information processing of the network information. A USB port 28, power switch 30 and LED indicator 32 allow users to interact with server blade 10. First and second hard disk drives 34 are disk storage devices that provide information storage to other components of the information handling system.

Server blade 10 provides a reduced footprint by making efficient use of the available surface area of motherboard 12. For instance, hard disk drives 34 are coupled to motherboard 12 in an elevated manner to provide space between the bottom surface of hard disk drive 34 and motherboard 12 to place information handling system components. In the embodiment depicted by FIG. 1, video module 26 is disposed on motherboard 12 beneath one hard disk drive 34 and south bridge 24 is disposed on motherboard 12 beneath another hard disk drive 34. In addition, wire lines 36 are routed through motherboard 12 beneath hard disk drives 34 to allow communication between USB port 28, power switch 30 and LED indicators 32 with other information handling system components of server blade 10. Hard disk drive motherboard interfaces 38 extend up from motherboard 12 to provide electronic communication to hard disk drives 34 in their elevated position above motherboard 12. A fan 40 pulls cooling air across server blade 10 to remove heat generated by components such as hard drives 34 and processors 14. The space provided between hard drives 34 and motherboard 12 by the elevated mounting of hard drives 34 defines a channel for air to flow to aid in cooling hard drives 34 and processors 14.

Figure 2:
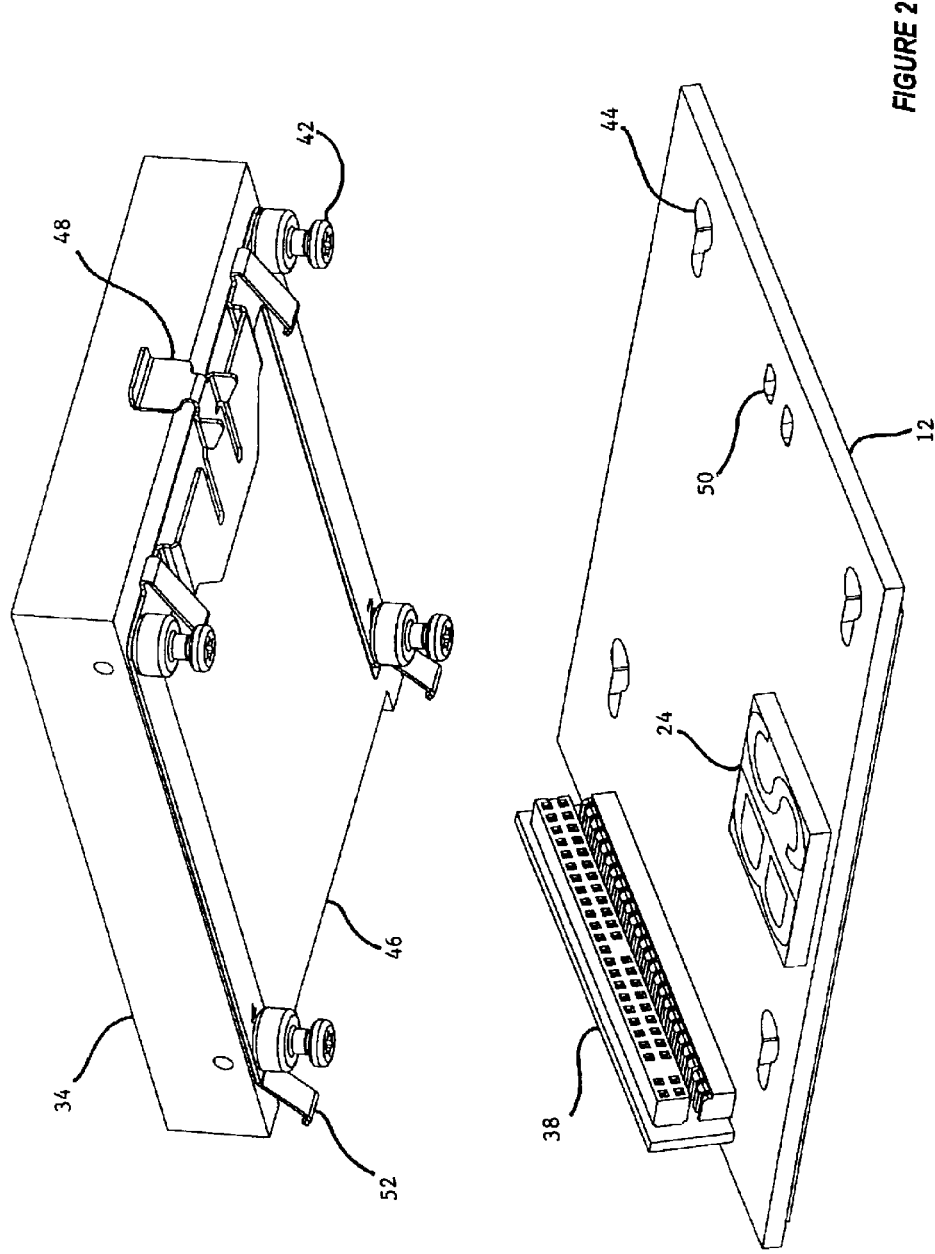
FIG. 2 depicts an isometric assembly view of a disk storage device coupling to a circuit board.

Referring now to FIG. 2, a blow-up isometric view depicts tool-less mounting of a hard disk drive assembly 34 to motherboard 12 in an elevated position that leaves space between hard drive 34 and motherboard 12 for mounting other components, such as a bridge chip 24. Four shoulder screws 42 each couple to the bottom surface of hard drive 34 at one end and have a revolved notch at the other end extending from hard drive 34. Motherboard 12 has four keyhole-shaped openings 44 each having a circular portion with a wide width and a slot portion with a narrow diameter. Shoulder screws 42 insert into openings 44 and guide hard drive 34 forward through the narrow slot portion of openings 44 so that interface 46 inserts into motherboard interface 38. Shoulder screws 42 slides through the narrow portion of opening 44 to secure hard drive 34 to motherboard 12 and a locking spring 48 inserts into a locking opening 50 to prevent hard drive 34 from sliding back out of the locked position. Elevation springs 52 reduce movement of hard drive 34 by pushing against the surface of motherboard 12 to force the lip of the recessed portion of shoulder screw 42 against the surface of motherboard 12.

Figure 3:
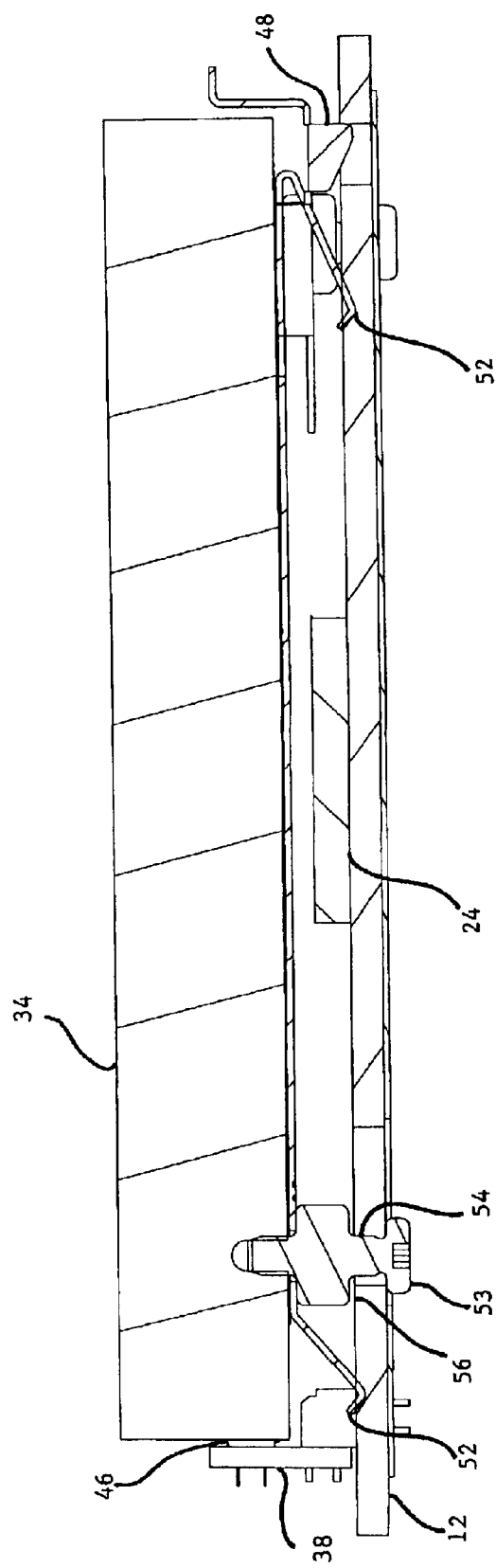
FIG. 3 depicts a side cutaway view of a hard disk drive coupled to a motherboard with an elevated attachment device.

Hard drive 34 is secured to motherboard 12 in a tool-less manner by aligning shoulder screws 42 with openings 44 and sliding hard drive interface 46 to insert into motherboard interface 38 until locking spring 48 secures into locking opening 50. Referring now to FIG. 3 a side cutaway view illustrates a hard drive 34 secured to a motherboard 12 by shoulder screw attachment devices 42 having a wide diameter portion 53 and a narrow recessed diameter portion 54 that form a lip portion 56. Lip portion 56 rests firmly against the surface of motherboard 12 due to the force applied by elevation spring 52. In one embodiment, shoulder screw 42 has three diameters that form lip portion 56 so that the upper portion of lip 56 has a greater diameter than opening 44. The larger diameter allows shoulder screw 42 to rest on motherboard 12 before sliding the recessed portion into the slot of opening 44. A space is provided by the elevation of hard drive 34 over motherboard 12 that allows room for components, such as bridge chip 24, to couple to motherboard 12 beneath hard drive 34, and also provides a channel for cooling air to flow between the lower surface of hard drive 34 and the upper surface of motherboard 12. The size of the space between hard drive 34 and motherboard 12 may be varied by varying the length of shoulder screw 42 from its attachment at hard drive 34 to its lip portion 56. Motherboard interface 38 may connect with hard drive interface 46 with a cable, a right angle connector or an interposer that extends from motherboard 12 as is depicted by FIG. 3.

Figure 4:
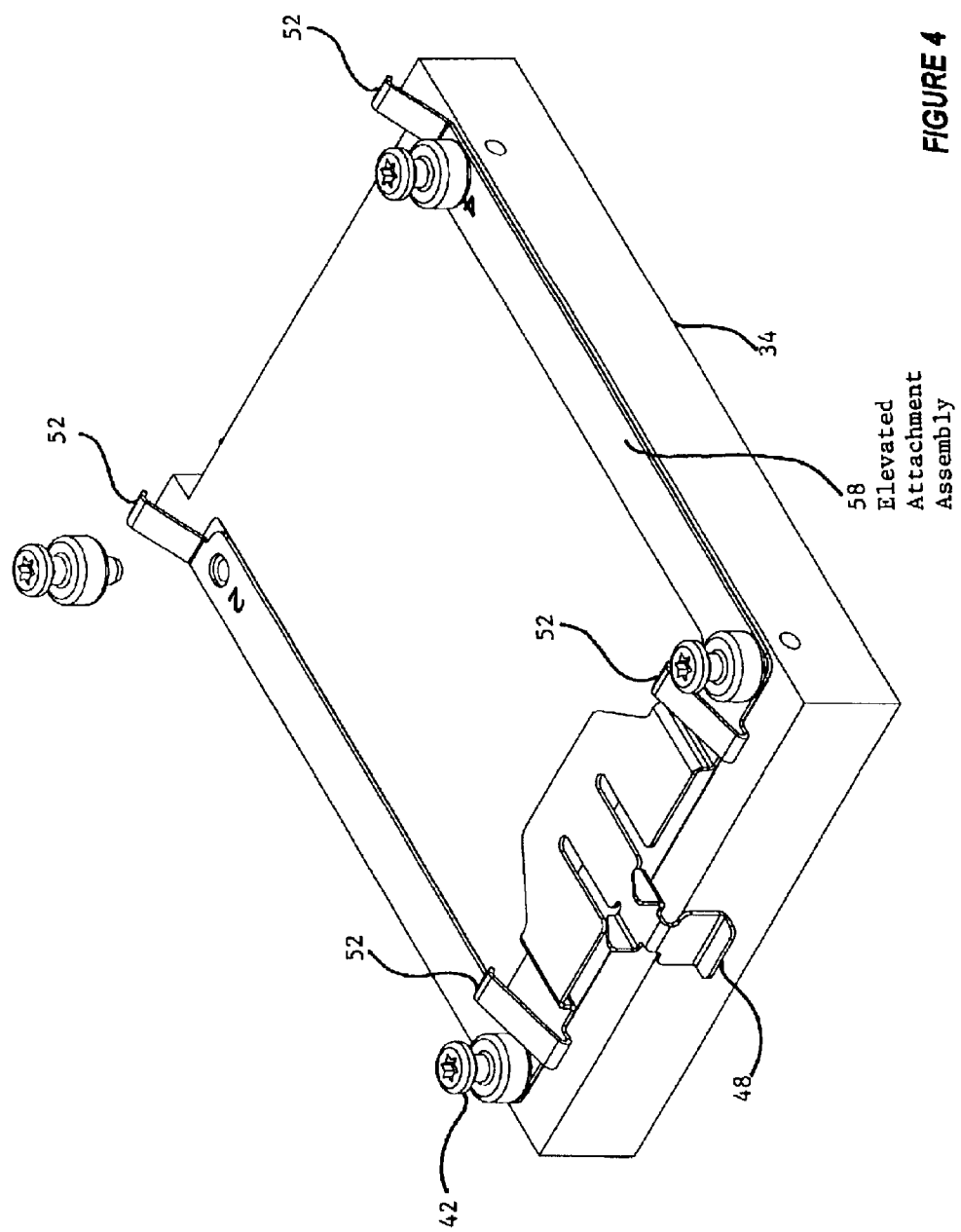
FIG. 4 depicts a bottom isometric view of a hard disk drive with an elevated attachment assembly.

Referring now to FIG. 4, an isometric bottom view of a storage device 34 depicts an elevated attachment assembly 58 that provides a convenient tool-less add-on elevation feature. Elevated attachment assembly 58 is formed as a single piece made of flexible plastic or metal and secured to the bottom surface of storage drive device 34 by screwing attachment devices 42 into storage drive device 34 over elevated attachment assembly 58. Elevated attachment assembly 58 may be secured to different types of storage devices to adapt the storage devices for tool-less attachment to a motherboard or other type of support surface.

Figure 5:
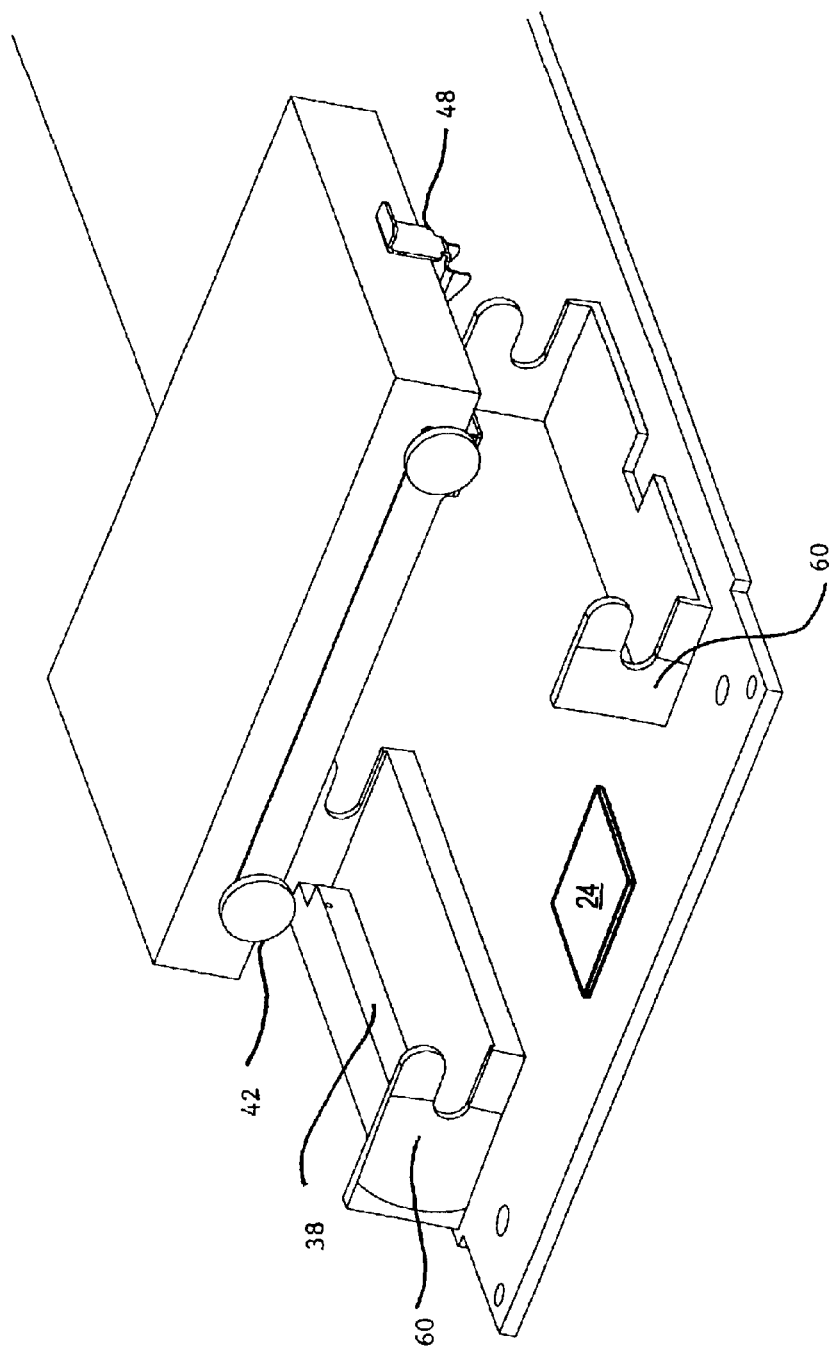
FIG. 5 depicts one alternative embodiment for coupling a storage disk drive to a circuit board with space for disposing components beneath the disk drive.

Referring now to FIG. 5 an alternative embodiment of elevated attachment assembly 58 is depicted. Cradle-shaped supports 60 hold storage drive device 34 in position. Attachment devices 42, such as shoulder screws, insert through openings in arms 60 that support storage drive device 34 in an elevated position over motherboard 12. The elevated position provides room for information handling components, such as bridge device 24, interfaced with motherboard 12 below the bottom surface of storage drive device 34. In alternative embodiments, a variety of attachment assemblies and attachment devices may be used to a hold storage device in an elevated position relative to a circuit board or other surface, regardless of the orientation of the circuit board in the information handling system, to provide space for disposing components on the circuit board below the storage device. The space between the bottom surface of the storage device and the board also provides a cooling air flow channel for cooling all sides of the storage device and reducing the obstructions along the motherboard to the cooling air flow for more effective cooling of processors and other components.

Although the present invention has been described in detail, it should be understood that various changes, substitutions and alterations can be made hereto without departing from the spirit and scope of the invention as defined by the appended claims.

What is claimed is:

1. An information handling system comprising:
   a printed circuit board operable to support electronic communications between information handling system components, the printed circuit board having one or more openings, the opening having a first portion with a first diameter and a second portion with a second diameter;
   an attachment device assoicated with each opening, the attachment device having an outer diameter sized to fit in the circuit board opening first portion, the attachment device further having a recessed area having an inner diameter sized to slidingly secure to the circuit board at the second portion;
   one or more hard drives coupled to the printed circuit board by sliding engagement of one or more attachment devices, the attachment devices having a height to define a space between the hard drive and the printed circuit board; and
   one or more components coupled to the printed circuit board in the space defined between the hard drive and the printed circuit board.

2. The information handling system of claim 1 wherein the one or more components comprise a bridge chip.

3. The information handling system of claim 1 wherein the one or more components comprise a video chip.

4. The information handling system of claim 1 further comprising:
   one or more components coupled to the printed circuit board outside of the space defined between the hard drive and the printed circuit board; and
   wire lines disposed in the printed circuit board to support electronic communications with the components coupled to the printed circuit board, the wire lines routed in the space defined between the hard drive and the printed circuit board.

5. The information handling system of claim 4 wherein the one or more components coupled to the printed circuit board outside of the space defined between the hard drive and the printed circuit board comprise one or more processors, the space providing a channel for cooling air flow to the one or more processors.

6. The information handling system of claim 5 farther comprising plural processors configured as a server blade.

7. The information handling system of claim 1 wherein the attachment devices comprise shoulder screws that couple to the bard drive and to the printed circuit board.

8. A method for configuring information handling system components, the method comprising:
   coupling plural components to a motherboard, the components in electronic communication to perform information processing;
   coupling a storage device to the motherboard over one or more of the plural components with one or more shoulder screws, each shoulder screw inserted into an opening of the motherboard and slid to engage a recessed portion of the shoulder screw to the motherboard surface, the storage device elevated from the motherboard to provide space for the components; and
   interfacing the storage device in electronic communication with the motherboard.

9. The method of claim 8 wherein the storage device comprises a hard disk drive.

10. The method of claim 8 further comprising:
    configuring the components as a server blade.

11. The method of claim 8 further comprising:
    coupling the storage device to the motherboard with a lock that engages the storage device to the motherb ard to prevent sliding of the shoulder screw recessed portion relative to the motherboard surface.

12. The method of claim 11 wherein coupling a storage device further comprises:

disposing one or more springs between the motherboard and the storage device to push the walls of the recessed portion of the shoulder screws against the motherboard.

13. The method of claim 8 wherein coupling a storage device further comprises coupling plural hard disk drive storage devices to the motherboard over one or more of the plural components, each hard disk drive storage device elevated from the motherboard to provide space for the components.

14. The method of claim 13 wherein the component disposed below the disk storage device comprises a bridge chip.

15. The method of claim 8 further comprising:

flowing cooling air through the apace between the storage device and the motherboard.

16. A server blade comprising:

plural components operable to handle network information;

a circuit board interfaced with the components and operable to support communication between one or more of the components, the circuit board having one or more openings;

one or more attachment devices, each attachment device operable to couple to the circuit beard by sliding engagement with a circuit board opening;

a storage drive interfaced with one or more of the components through the circuit board, the storage drive coupled to the circuit board with the one or more attachment devices so that one or more components are disposed between the storage drive and the circuit board.

17. The server blade of claim 16 wherein the storage drive comprises a hard disk drive, the server blade further comprising plural hard disk drives coupled to the circuit board so that one or more components are disposed between each hard disk drive and the circuit board.

18. The server blade of claim 17 wherein the plural components comprise plural central processing units.

19. The server blade of claim 18 further comprising a fan disposed proximate the circuit board and operable to flow cooling air between the hard disk drives and the circuit board.

20. The server blade of claim 19 further comprising routing wires associated with the circuit board to interface components, the routing wires disposed beneath the hard disk drives.

21. The server blade of claim 16 wherein the one or more attachment devices coupling the hard disk drive to the circuit board comprise shoulder screws having a height to form a predetermined space between the hard disk drive and the circuit board.

22. The server blade of claim 21 wherein the shoulder screws couple to the circuit board with a recessed portion that inserts into the openings formed in the circuit board and slides to engage the circuit board at a narrowed portion of the opening with the recessed portion.

23. The server blade of claim 21 further comprising:

an interface support that interfaces the hard disk drive with the circuit board at a predefined distance above the circuit board;

wherein the attachment devices comprise screws that couple the hard disk drive to the interface support.

* * * * *